United States Patent [19]

Moisson et al.

[11] Patent Number: 4,623,156
[45] Date of Patent: Nov. 18, 1986

[54] OPTICAL FIBER CHUCK

[75] Inventors: Marc F. Moisson, Los Altos; Martin L. Wisecarver, Sonora, both of Calif.

[73] Assignee: Raychem Corporation, Menlo Park, Calif.

[21] Appl. No.: 778,725

[22] Filed: Sep. 19, 1985

Related U.S. Application Data

[63] Continuation of Ser. No. 575,615, Jan. 31, 1984, abandoned.

[51] Int. Cl.⁴ ............................................. B25B 11/02
[52] U.S. Cl. .................................... 279/106; 269/902; 269/903; 350/96.10; 350/96.20
[58] Field of Search ............... 279/106; 269/272, 902, 269/903; 350/96.10, 96.20

[56] References Cited

U.S. PATENT DOCUMENTS

| | | | |
|---|---|---|---|
| 2,561,819 | 7/1951 | Porter et al. | 408/97 |
| 2,749,781 | 6/1956 | Herzl | 408/97 |
| 4,079,927 | 3/1978 | Rocton | 269/903 |
| 4,102,717 | 7/1978 | Hensel | 156/378 |

FOREIGN PATENT DOCUMENTS 39509  4/1981  Japan ................................ 350/96.20

OTHER PUBLICATIONS

IBM Technical Disclosure Bulletin, vol. 22, No. 2, Jul., 1979, pp. 686–687.

Primary Examiner—Gil Weidenfeld
Assistant Examiner—Daniel W. Howell
Attorney, Agent, or Firm—Dennis E. Kovach; Herbert G. Burkard

[57] ABSTRACT

A chuck for holding an optical fiber in precise position includes first and second contiguous V-grooves, a chuck cover having a plurality of inter-leaving fingers for urging an optical fiber into the first V-groove so as to roughly position the optical fiber, and a plate for subsequently urging the optical fiber into the second V-groove for precise positioning of the optical fiber. The second V-groove is much smaller than the first V-groove and has a width which is less than the diameter of the optical fiber.

12 Claims, 4 Drawing Figures

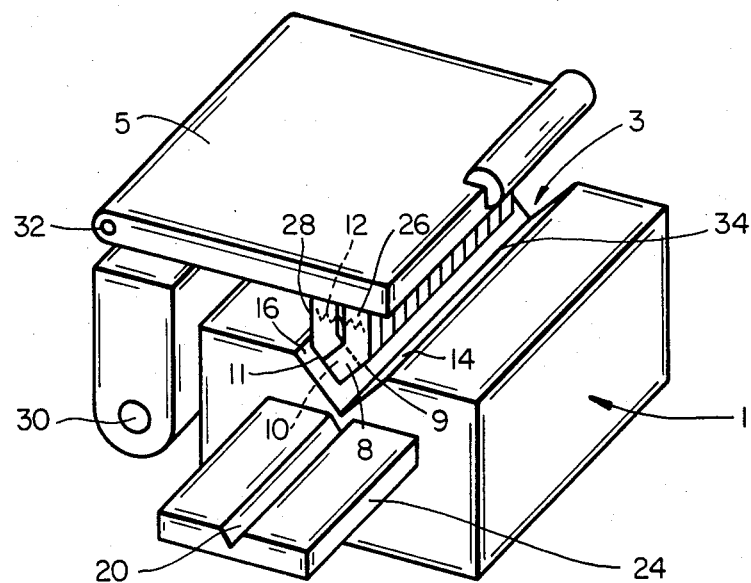
FIG_1
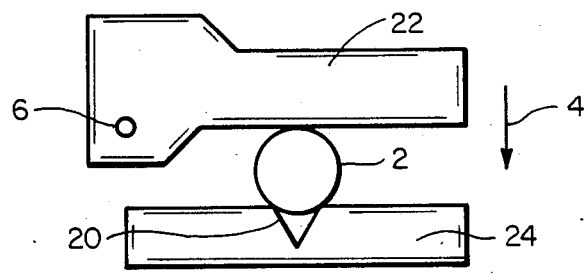
FIG_2
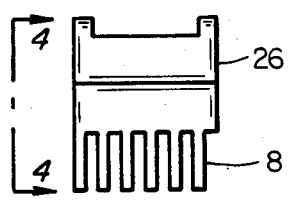
FIG_3
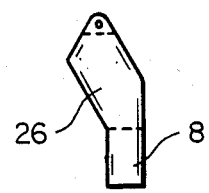
FIG_4

OPTICAL FIBER CHUCK

This application is a continuation of application Ser. No. 575,615, filed Jan. 31, 1984, now abandoned.

BACKGROUND OF THE INVENTION

1. Field of the Invention

The present invention relates to a chuck for optical fibers, especially to a chuck for use in an optical fiber splice.

2. Description of the Prior Art

Various techniques are used for splicing optical fibers, including fusion of the fiber ends and adhesives for joining the fiber ends in an index-matching adhesive.

The techniques for splicing optical fibers rely on mechanical alignment of the fiber ends with respect to one another. The mechanical alignment must be done with precision in order to achieve satisfactory three-dimensional alignment of the two fibers in the longitudinal axis and the lateral axes and in order to achieve the proper distance between the ends of the fibers before the splice is effected and possibly to adjust the fibers while the splice is being made.

Micromanipulators capable of moving in three axes with the required precision, such as tenths of microns, are available. Fiber optic chucks such as the chucks of this invention are affixed to the micromanipulators to provide the required precision alignment for optical fiber splicing.

A single V-groove has conventionally been used in fiber optic chucks, as is shown in Hensel, U.S. Pat. No. 4,102,717. However, such a groove construction presents problems in that the optical fiber frequently sticks to the sides of the groove thus preventing the optical fiber from being precisely positioned at an apex portion of the groove. When any portion of the optical fiber is not positioned at the apex of the groove of the fiber chuck, improper alignment of the fiber at the splice location can result.

SUMMARY OF THE INVENTION

An object of the present invention is to provide an optical fiber chuck capable of receiving and precisely positioning different size optical fibers.

This and other objects are achieved by utilizing a chuck body having on its upper surface a first straight V-groove into which an optical fiber is loaded, a chuck cover pivotally mounted on the chuck body between a loading position and an operating position, the chuck cover including first and second sets of inter-leaving fingers which respectively slide along first and second sides of the V-groove toward an apex thereof to urge the loaded optical fiber toward the apex as the chuck cover is moved from its loading position to its operating position, and means for biassing the first and second sets of inter-leaving fingers away from each other and towards the respective sides of the V-groove.

The invention further optionally includes a plate secured to the chuck body at a front portion thereof, the plate having a second straight V-groove therein which is aligned with and extends from an end of the first V-groove, the second V-groove being smaller than the first V-groove, as well as means for urging a portion of the loaded optical fiber extended from the first V-groove into the second V-groove. Preferably, the second V-groove has a maximum width which is less than a diameter of the loaded optical fiber.

BRIEF DESCRIPTION OF THE DRAWINGS

FIG. 1 is a perspective view of an optical fiber chuck constructed according to the present invention wherein a biassing means 22 for urging an optical fiber into a second V-groove 20 has been omitted for clarity;

FIG. 2 is a plan view of the biassing means 22 omitted from FIG. 1;

FIG. 3 is a plan view of a set of fingers 8 illustrated in FIG. 1; and

FIG. 4 is a side view taken along the lines 4—4, shown in FIG. 3.

DESCRIPTION OF THE PREFERRED EMBODIMENTS

FIG. 1 is a perspective view of an optical fiber chuck constructed according to the present invention wherein a biassing means 22 for biassing an optical fiber 2 into a V-groove 20 has been omitted for clarity. The biassing means 22, which can comprise a plate 22, is illustrated in FIG. 2. The plate 22 is biassed toward the direction of an arrow 4 illustrated in FIG. 2 so as to urge the optical fiber 2 into the V-groove 20. Reference numeral 6 illustrates a pivot around which the plate 22 is biassed.

Referring to FIG. 1, a chuck base 1 contains a V-groove 3 for roughly positioning the optical fiber 2 (not shown in FIG. 1). A chuck cover 5 is pivotally mounted on the chuck body 1 between a loading position and an operating position, and first and second sets of inter-leaved fingers 8, 10 extend downward from the chuck cover 5 towards the V-groove 3. The first and second sets of inter-leaved fingers 8, 10 are biassed away from each other by spring 12 so as to be normally urged towards respective sides 14, 16 of the V-groove 3. The fingers 8, 10 respectively extend from integral supporting members 26, 28, as best illustrated in FIG. 1, and in a preferred embodiment, the member 26 and accompanying fingers 8 have a construction identical to that of the member 28 and accompanying fingers 10 with the members 26, 28 being mounted in reverse fashion such that the fingers 8 inter-leave between the fingers 10.

A plate 24 extends from a front portion of the chuck body 1, and a second V-groove 20 is contained in the plate 24 such that the second V-groove 20 extends from an end of the first groove 3 and is commonly aligned therewith. A size and depth of the second V-groove 20 is much smaller than that of the first V-groove 3, and in a preferred embodiment, the second V-groove 20 has a maximum width less than a size of an optical fiber to be positioned thereby specifically, a maximum width approximately half that of the fiber diameter. Biassing means 22 rotatable about pivot 6 by spring means (not shown) so as to be urged in the direction of arrow 4 urges a portion of the fiber adjacent the second V-groove 20 towards and against the second V-groove 20 as best illustrated in FIG. 2.

In operation, the chuck cover 5 is pivoted such that fingers 8, 10 are displaced away from the first V-groove 3 and the biassing means 22 is rotated about the pivot 6 in a direction opposite the arrow 4. In this state, an optical fiber to be precisely positioned is placed in the first V-groove 3 so that a portion of the optical fiber 2 is adjacent V-groove 20. Subsequently, the chuck cover 5 is pivotted about pivots 30, 32 for roughly positioning the optical fiber 2 in a bottom-most portion of the first V-groove 3 such that the optical fiber 2 is adjacent an apex 34 of the first V-groove 3. Since the finger supporting members 26, 28 are biassed away from each other by spring 12, side surfaces 9, 11 of the first and second surfaces 9, 11 are urged against sides 14, 16 of the first V-groove 3 and slide laterally down the sides 14, 16. As the fingers 8, 10 slide downwards and are guided by the sides 14, 16, the optical fiber 2 is precisely positioned adjacent the apex 34 of the first V-groove 3 so as to roughly position the optical fiber 2. In this state, a portion of the optical fiber 2 extends over and adjacent to the second V-groove 20. An end of the optical fiber to be spliced extends in front of the plate 24. To achieve precise positioning of the end of the optical fiber to be spliced, the biassing means 22 is rotated about the pivot 6 in the direction of arrow 4 so as to urge the portion of the optical fiber 2 adjacent to the second groove 20 into contact with upper portions of the second groove 20. Preferably, the maximum diameter of the second groove 20 is smaller than the diameter of the optical fiber 2 for optimum positioning of the optical fiber.

Means for moving the optical fiber 2 along a direction parallel to a direction of extension of the first and second V-grooves 3, 20 is described in copending application Ser. No. 466,683, filed on Feb. 15, 1983, now U.S. Pat. No. 4,537,466, which application is assigned to the assignee of the present invention. The disclosure of this application is incorporated herein by reference.

Since the first V-groove 3 and inter-leaving fingers 8, 10 are formed such that sides 9, 11 of the fingers 8, 10 are in sliding contact with sides 14, 16 of the V-groove 3, precise rough positioning of the optical fiber 2 within the V-groove 3 is readily achievable. Fine adjustment of the position of the optical fiber is then achieved by rotating the biassing means 22 about the pivot 6 such that the optical fiber 2 is urged into contact with the much smaller second V-groove 20.

Although the invention has been described in detail with respect to certain preferred embodiments, it is to be understood that its scope is not limited to those embodiments but only by the attendant claims and their reasonable equivalent.

We claim:

1. A chuck for holding an optical fiber in precise position, comprising:
    a chuck body having on its upper surface a first straight V-groove into which an optical fiber is loaded;
    a chuck cover pivotally mounted on said chuck body between a loading position and an operating position; and
    said chuck cover including first and second sets of inter-leaving fingers which respectively slide along first and second sides of said V-groove towards an apex of said V-groove and urges said loaded optical fiber towards said apex as said chuck cover is moved from its loading position to its operating position.

2. The chuck as claimed in claim 1 further comprising means for biassing said first and second sets of fingers away from each other and towards said respective sides of said V-groove as the chuck is moved from its loading position to its operating position.

3. The chuck as claimed in claim 2, said chuck cover further including first and second pivot means for respectively pivotally mounting said first and second sets of fingers.

4. The chuck as claimed in claim 3, said pivoting means comprising first and second finger supporting members.

5. The chuck as claimed in claim 4, said first and second supporting members being identically formed and being pivotally mounted such that fingers of said first supporting member inter-leaves with fingers of said second supporting member as said chuck is moved from its loading position to its operating position.

6. The chuck as claimed in claim 1, said chuck body including a plate secured to a front portion thereof, said plate having a second straight V-groove therein which is aligned with and extends from an end of said first V-groove, said second V-groove being smaller than said first V-groove; and
    further including means for urging a portion of said optical fiber extending from said first V-groove into said second V-groove.

7. The chuck as claimed in claim 6, said second V-groove having a maximum width less than a diameter of said optical fiber.

8. The chuck as claimed in claim 7, said urging means including a second plate pivotally mounted on said chuck body between a loading position and an operating position.

9. The chuck as claimed in claim 5, said chuck body including a plate secured to a front portion thereof, said plate having a second straight V-groove therein which is aligned with and extends from an end of said first V-groove, said second V-groove being smaller than said first V-groove; and
    further including means for urging a portion of said optical fiber extending from said first V-groove into said second V-groove.

10. The chuck as claimed in claim 9, said second V-groove having a maximum width less than a diameter of said optical fiber.

11. The chuck as claimed in claim 10, said urging means including a second plate pivotally mounted on said chuck body between a loading position and an operating position.

12. The chuck as claimed in claim 1, a maximum width of said first V-groove being substantially greater than a diameter of said loaded optical fiber.

* * * * *